(12) United States Patent
Abrahamsen et al.

(10) Patent No.: US 8,525,053 B2
(45) Date of Patent: Sep. 3, 2013

(54) ELECTRICAL SWITCHGEAR (75) Inventors: Michael H. Abrahamsen, Greenwood, SC (US); Jon C. Beaver, Greenwood, SC (US); Robert (Nmi) Yanniello, Asheville, NC (US); Chandrakant Z. Tailor, Greenwood, SC (US); William E. Wilkie, II, Fletcher, NC (US)

(73) Assignee: Eaton Corporation, Cleveland, OH (US)

( * ) Notice: Subject to any disclaimer, the term of this patent is extended or adjusted under 35 U.S.C. 154(b) by 406 days.

(21) Appl. No.: 12/831,574

(22) Filed: Jul. 7, 2010

(65) Prior Publication Data
US 2012/0006661 A1    Jan. 12, 2012

(51) Int. Cl.
*H01H 9/00* (2006.01)
*H01H 11/00* (2006.01)

(52) U.S. Cl.
USPC ..................... 200/50.21; 200/50.22

(58) Field of Classification Search
USPC .............. 200/238; 218/7, 147, 152–154
See application file for complete search history.

(56) References Cited

U.S. PATENT DOCUMENTS

| | | | |
|---|---|---|---|
| 3,899,722 A | 8/1975 | Cadez et al. | |
| 4,331,847 A * | 5/1982 | Cretin | 200/48 R |
| 7,479,612 B2 * | 1/2009 | Waldi et al. | 200/507 |
| 7,750,264 B2 * | 7/2010 | Laskowski et al. | 218/2 |

FOREIGN PATENT DOCUMENTS
GB   857 957 A   1/1961
GB   1 139 594 A   1/1969

OTHER PUBLICATIONS

European Patent Office, "extended European search report", Mar. 8, 2012, 5 pp.

* cited by examiner

*Primary Examiner* — Renee Luebke
*Assistant Examiner* — Lheiren Mae Caroc
(74) *Attorney, Agent, or Firm* — Eckert Seamans Cherin & Mellott, LLC; Kirk D. Houser (57) ABSTRACT

An electrical switchgear comprises a front, a back and a switch arrangement. The switch arrangement comprises a terminal arrangement comprising an electrical contact for a bus and an electrical contact for a load connection which are spaced apart along an axial direction; and a device that is driveable into said terminal arrangement to a service position to make an electrical connection between said electrical contact for said load connection and said electrical connection for said bus. The electrical contact for said load connection is located closer to said back of said switchgear than is said electrical contact for said bus.

14 Claims, 10 Drawing Sheets

ELECTRICAL SWITCHGEAR

BACKGROUND

1. Field

The disclosed concept relates to electrical switchgear.

2. Background Information

As is well known, switchgear is an integrated assembly of switches, circuit breakers, buses (i.e. power supply rails), fuses and other components used to isolate electrical equipment at an electrical installation, for example, an electrical power substation. Switchgear is used to both de-energise equipment to allow work to be done, switch loads, and to clear faults downstream of the switchgear. Switchgear is often housed in a metal cabinet at the installation.

In known installations, a distinction is made between so called 'fixed switchgear' and so called 'withdrawable switchgear'. In fixed switchgear the main switching/protective device, for example a circuit breaker, is fastened within the installation by fasteners, for example bolts, and cannot be removed from the installation without using tools to undo the fasteners. In withdrawable switchgear, additional constructional features enable the main switching/protective device to be withdrawn from the installation (and put back in) with a minimum usage of tools or with no usage of tools. Accordingly, in withdrawable switchgear, the main circuit breaker, for example, can be removed quickly for maintenance or replacement or to provide easy access to other components in the installation.

In known installations, a distinction is also made between so called 'rear accessible switchgear' and 'front accessible switchgear'. In rear accessible switchgear, access to the load connections (i.e. the connections to which power cables routed to the loads are connected) is gained by removing a rear panel of the switchgear cabinet, whereas in front accessible switchgear it is gained by removing a front panel of the cabinet.

It is desirable to provide improved electrical switchgear, in particular switchgear comprising a switching arrangement with relatively few components that is preferably compact and space efficient and allows for a straightforward configuration of a rear accessible switchgear.

SUMMARY

According to the disclosed concept, there is provided an electrical switchgear comprising a front, a back and a switch arrangement, the switch arrangement comprising a terminal arrangement comprising an electrical contact for a bus and an electrical contact for a load connection which are spaced apart along an axial direction; and a switching device that is moveable linearly in said terminal arrangement along said axial direction to a service position where it can make an electrical connection between said electrical contact for said load connection and said electrical connection for said bus, wherein said electrical contact for said load connection is located closer to said back of said switchgear than is said electrical contact for said bus.

Advantageously, this provides for a relatively compact switchgear. Locating the electrical contact for the load connection closer to the back of the switchgear than is the bus contact enables the components of a rear accessible switchgear to be conveniently spatially arranged to facilitate access to the switchgear.

According to the disclosed concept, there is provided, a switch arrangement for an electrical switchgear, said electrical switchgear comprising three phases, said switch arrangement comprising three terminals, one for each phase, wherein each of said three terminals comprises a longitudinal axis, which longitudinal axes define three parallel edges of a notional triangular prism.

According to the disclosed concept there is also provided a switch arrangement for an electrical switchgear, said electrical switch gear comprising three phases, said switch arrangement comprising three terminals, one for each phase, wherein said terminals are arranged in parallel with a first and a second of said terminals lying in a common plane and a third of the terminals lying outside of said plane.

Advantageously, such switch arrangements are compact.

BRIEF DESCRIPTION OF THE DRAWINGS

The disclosed concept will be described in more detail below, with reference to the accompanying drawings, in which.

DESCRIPTION OF THE PREFERRED EMBODIMENTS

Figure 1A:
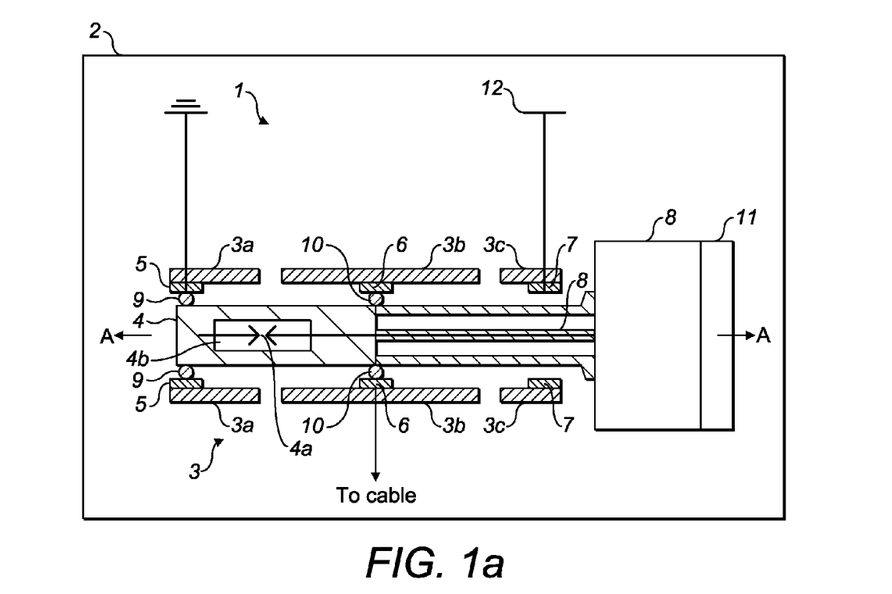
FIG. 1a is a schematic illustration of a side sectional view of a switch arrangement with a circuit breaker in a first position.
Figure 1B:
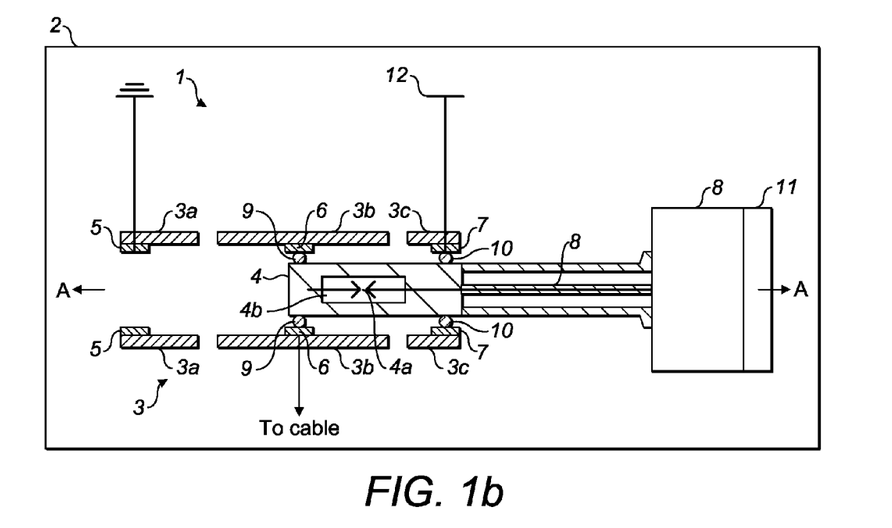
FIG. 1b is a schematic illustration of a side sectional view of the switch arrangement with the circuit breaker in a second position.
Figure 1C:
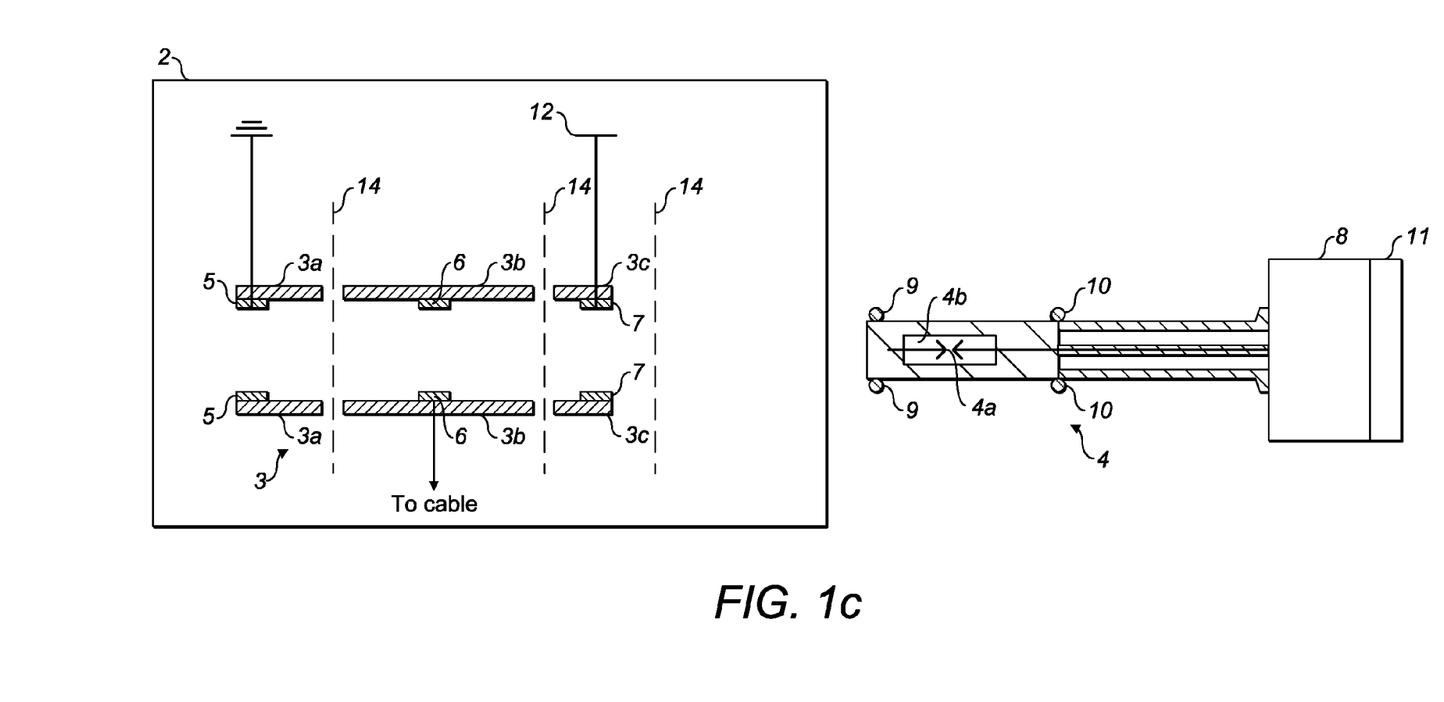
FIG. 1c is a schematic illustration of a sectional view of the switch arrangement with the circuit breaker in a third position.

Referring to FIGS. 1a to 1c, a switch arrangement 1 for an electrical switchgear 2 comprises an electrical pole or terminal 3 and a switching device 4, for example, a circuit breaker switching element. The terminal 3, is fixed within the switchgear 2 and comprises a housing made up of first 3a, second 3b and third 3c electrically insulating tubular sections of substantially equal internal diameter which are spaced apart lengthwise along a common longitudinal axis A. The three tubular sections may for example be formed of an epoxy resin material. Each of the three tubular sections 3a, 3b and 3c has a respective electrical contact 5, 6, 7 located inside of it. The first section 3a has an earth contact 5 that is electrically connectable to earth. The second section 3b has a cable contact 6 in electrical connection with a cable (not shown) of the switchgear 2 and hence to a load (not shown) and the third section 3c comprises a bus bar contact 7 in electrical connection with an electrical bus 12. In this example, the conductive contacts 5, 6, 7 are formed of metal, preferably copper, are ring shaped and arranged around the respective inner surfaces of the first 3a, second 3b and third 3c insulating sections.

The circuit breaker switching element 4, which may utilize a vacuum interrupter, is preferably generally cylindrical in shape, and is arranged lengthwise along the axis A and is moveable in and out of the inside of the terminal 3. If the breaker 4 utilizes a vacuum interrupter, as is standard with such devices, it comprises two internal electrical contacts 4a, enclosed in a vacuum chamber 4b, one fixed and the other moveable and a breaker actuator assembly 8 for moving the moveable contact away from the fixed contact to switch load or open (i.e. trip) the circuit breaker switching element 4 in the event of a fault (e.g. an over current) being detected. The circuit breaker switching element 4 may of course utilize other types of interrupter, for example, a SF6 gas interrupter.

In this embodiment, the circuit breaker switching element 4 further comprises at its respective ends, first 9 and second 10 external electrical contacts, each of which is preferably a ring shaped metal (e.g. copper) coil located in a respective annular groove (not shown) that extends around an external diameter of the circuit breaker switching element 4, although different arrangements of contacts are also possible, for example, pad shaped contacts.

The switch arrangement 1 further comprises a powered drive mechanism 11 for causing linear movement of the circuit breaker switching element 4, in the terminal 3, between a first position illustrated in FIG. 1a and a second position shown in FIG. 1b.

Figure 2A:
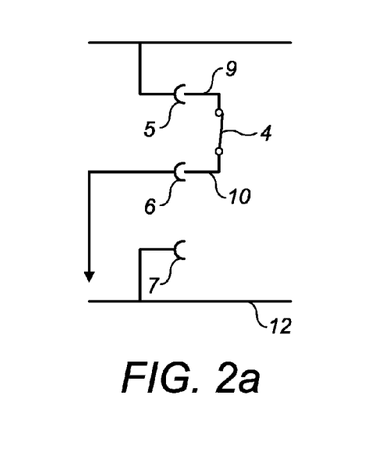
FIGS. 2a to 2d are circuit diagrams of the switch arrangement in various switch configurations.
Figure 2B:
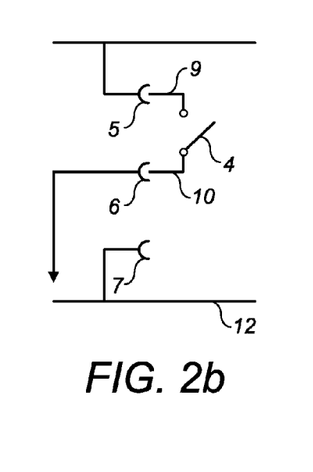

In the first position, the first contact 9 slideably engages the earth contact 5 and the second contact 10 slideably engages the cable contact 6. Accordingly, as illustrated in the circuit diagram of FIG. 2a, when the circuit breaker switching element 4 is in the first position and is closed (i.e. the internal contacts 4a are closed) the cable contact 6 is electrically isolated from the bus-bar contact 7, but is electrically connected to the earth contact 5, and hence earth, via the circuit breaker 4. When the circuit breaker switching element 4 is in the first position and is open, as is illustrated in FIG. 2b, the cable contact 6 is electrically isolated from the bus-bar contact 7 and from the earth contact 5. In one or other of these configurations of the first position, maintenance or testing of components can be performed.

Figure 2C:
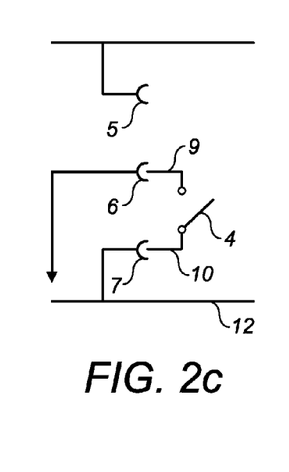
Figure 2D:
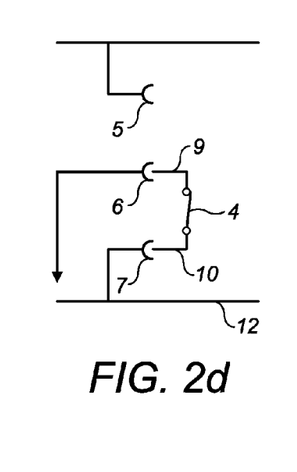

In the second position, the first contact 9 slideably engages the cable contact 6 and the second contact 10 slideable engages the busbar contact 7. Accordingly, as illustrated in the circuit diagram of FIG. 2c, when the circuit breaker switching element 4 is in the second position and is open, the cable contact 6 is electrically disconnected from the busbar contact 7 (and hence the bus bar 12) by the open circuit breaker switching element 4. As illustrated in FIG. 2d, when the circuit breaker switching element 4 is in the second position but is closed, the cable contact 6 is electrically connected to the bus bar contact 7 via the circuit breaker switching element 4 so that the switch gear arrangement 1 can supply power to the load (not shown) via the busbar 12.

FIG. 1c illustrates the circuit breaker switching element 4 in a third position in which it is withdrawn from the switch gear arrangement 1. The circuit breaker switching element 4 may be driven between this position and the second position along the axis A by the drive mechanism 11. Alternatively, the circuit breaker 4 and the drive mechanism may be constructed as an integrated unit, which a human operator can manipulate manually between the second and third positions or can be power driven between the second and third positions.

Optionally, as illustrated in FIG. 1c, three shutters 14 are provided, one of which can be drawn into the space between the first section 3a and the second section 3b, another of which can be drawn into the space between the second section 3b and the third section 3c and the last of which can be drawn in front of the opening of the third section 3c position shown in FIG. 1c. Accordingly, the shutters 14 may be drawn when the breaker is removed from the housing 3, to act as physical barriers to the contacts 5, 6 and 7.

The housing 3 may be transparent to allow for easy visible inspection of components.

Figure 3:
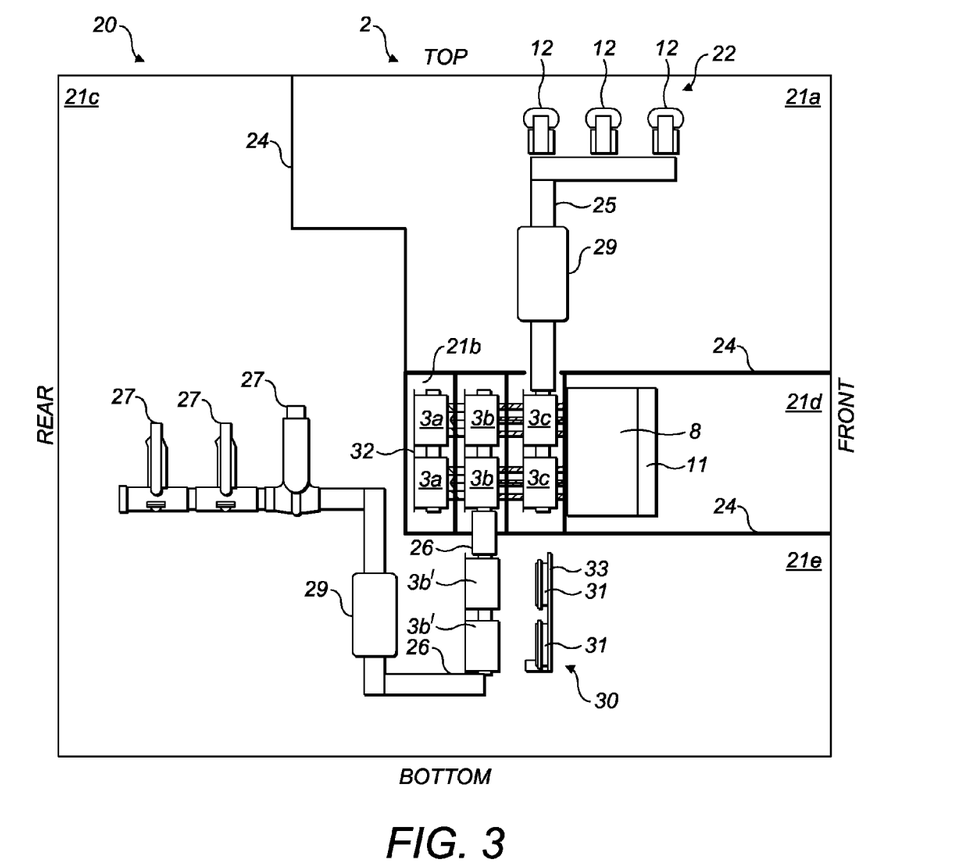
FIG. 3 is a schematic side view of the inside of an electrical switchgear comprising a switch arrangement comprising a three pole circuit breaker with circuit breaker switching elements shown in the first position.
Figure 5A:
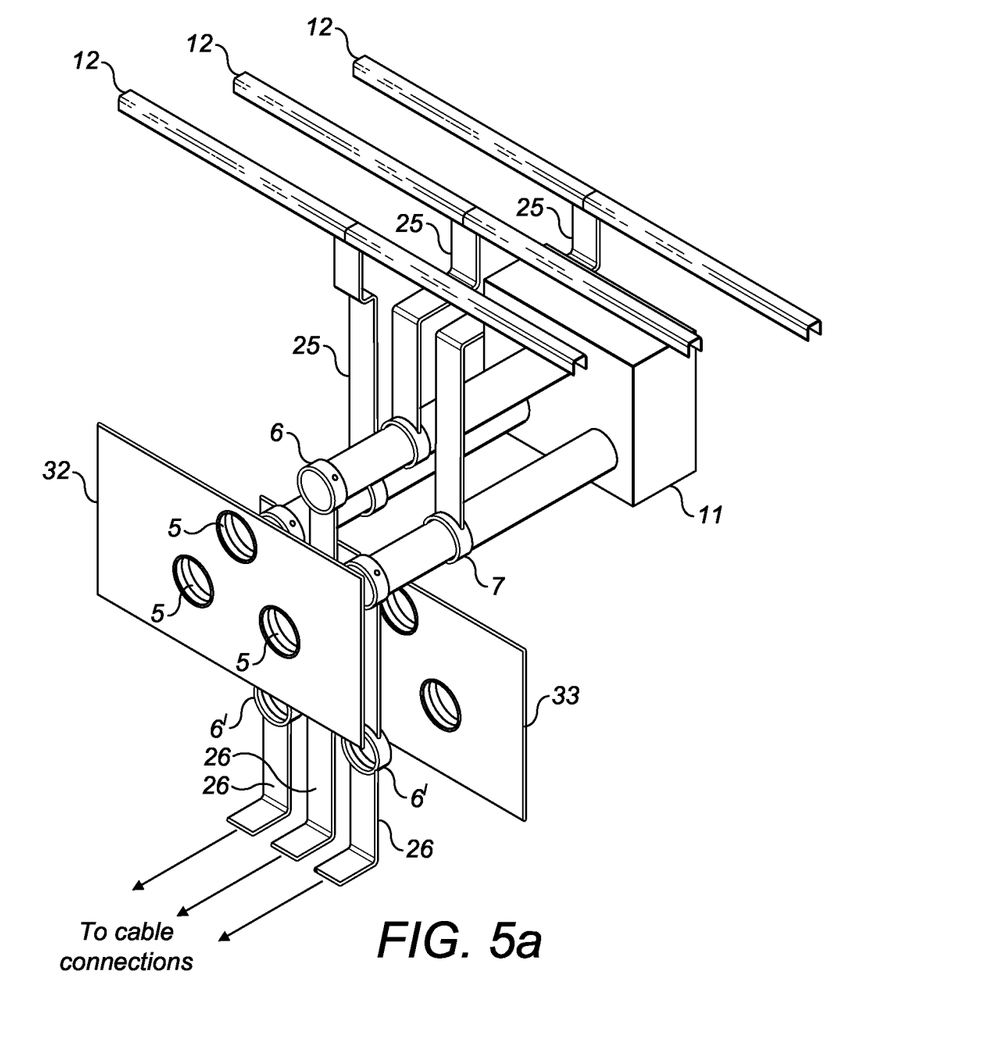
FIGS. 5a and 5b are schematic isometric views of the inside of the electrical switch gear comprising the switch arrangement with the circuit breaker switching elements shown in the second position.
Figure 5B:
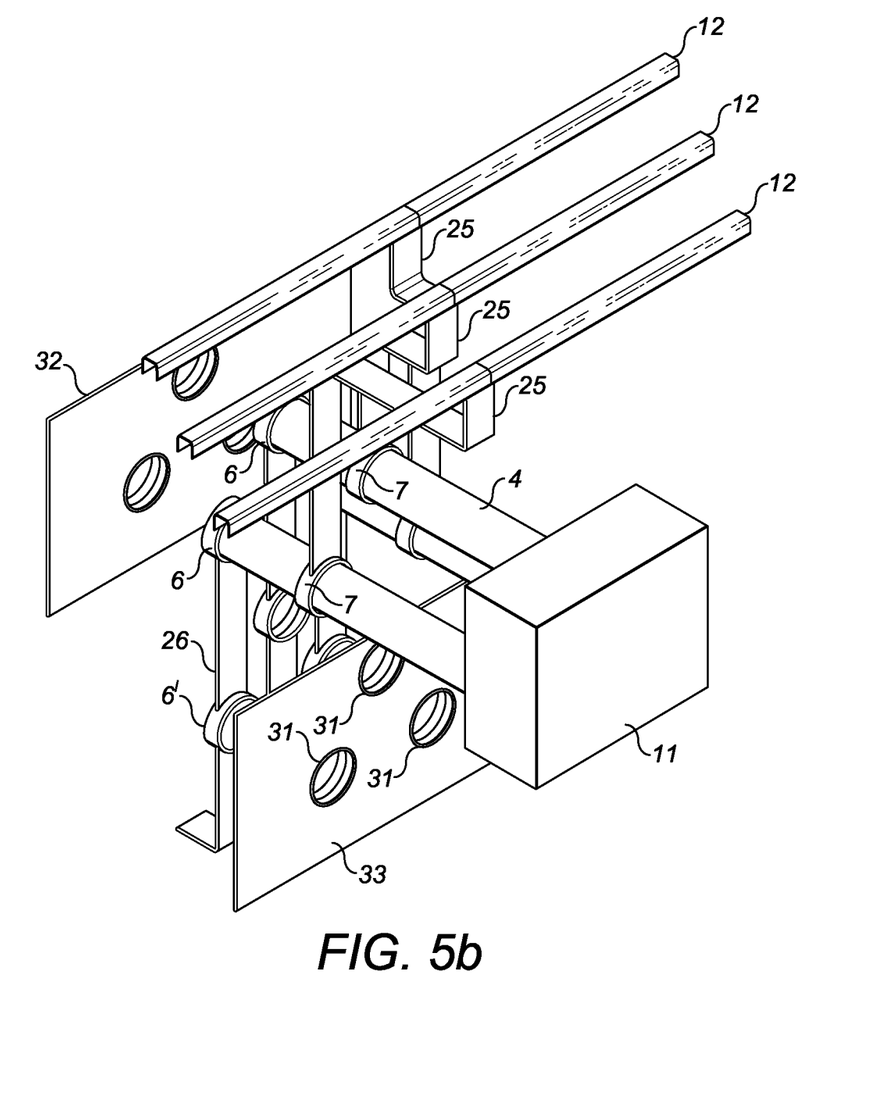
Figure 6:
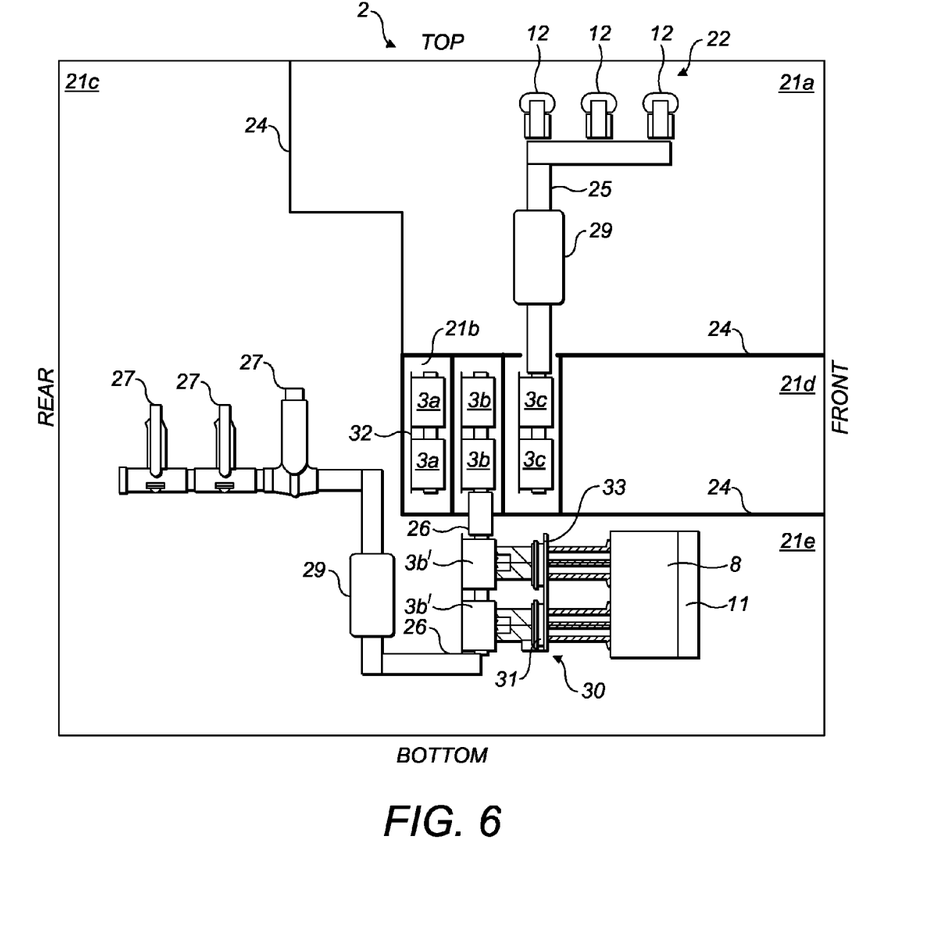
FIG. 6 is a schematic side view of the inside of the electrical switchgear comprising the switch arrangement with the circuit breaker switching elements shown in a fourth position.

FIGS. 3 and 6 illustrate a side view of the inside of an electrical rear accessible switchgear cabinet 20, embodying the disclosed concept. FIGS. 4a and 4b and 5a and 5b illustrate schematic isometric views of the cabinet 20. For reasons of clarity certain of the features illustrated in FIG. 3 are omitted from FIGS. 4a and 4b and 5a and 5b. For example, the tubular sections 3a, 3b and 3c are omitted from FIGS. 4a and 4b and 5a and 5b, but the contacts 5, 6 and 7 are shown. Features the same as those already described with respect to FIGS. 1 and 2 are given the same reference numerals in FIGS. 3 to 7 as they are in FIGS. 1 and 2.

The cabinet 20 is divided by internal partitions 24 into a plurality of compartments 21a to 21e containing the internal components of the switchgear 2. The switchgear 2 comprises a first busbar arrangement 22 in an upper forward compartment 21a. The first busbar arrangement 22 is a three-phase system comprising three conductive busbars 12 (i.e. one for each phase).

The switchgear 2 further comprises three terminals 3, one for each phase, (only two are visible in the view of FIGS. 3 and 6), of the type illustrated in FIGS. 1a to 1c, contained in a middle compartment 21b, and a three pole breaker device comprising three circuit breaker switching elements 4, one for each phase, each of the type illustrated in FIGS. 1a to 1c, and associated with a respective one of the three terminals 3. The three pole breaker device comprises a breaker actuator assembly 8 for opening/closing the breaker switching elements 4 in unison, for example, for opening (i.e. tripping) the breaker switching elements 4 in unison if a fault is detected. If the breaker switching elements 4 are vacuum interrupters the beaker actuator assembly 8 will move the moveable stems of the interrupters to open/close the breakers.

Each of the busbars 12 is connected to a respective one of three conductors 25, which is routed to the bus bar contact 7 of a respective one of the third tubular sections 3c. Each of the first tubular sections 3a is fitted through a respective one of three apertures formed in a conductive ground plane sheet 32 and each earth contact 5 is in circumferential contact with the ground plane 32. A rear compartment 21c contains three groups of three cable terminations 27 (only one group of the three is visible in FIG. 3 and they are omitted from FIGS. 4 and 5) which are connectable to cables (not shown) routed to a load (not shown). Each group of three cable terminations 27 is connected to a respective one of three conductors 26, each of which is routed to a cable contact 6 of a respective one of the second tubular sections 3b. Each conductor 25, 26 may be fitted with measuring equipment 29, for example, a current transformer, voltage transformer or other such device. Although in the illustrated embodiment the cable terminations 27 are upwards facing, which is convenient for connecting to cables routed downwards from the top of the cabinet 20, they could just as well be downwards facing, which is convenient for connecting to cables routed downwards from the bottom of the cabinet 20.

Figure 4A:
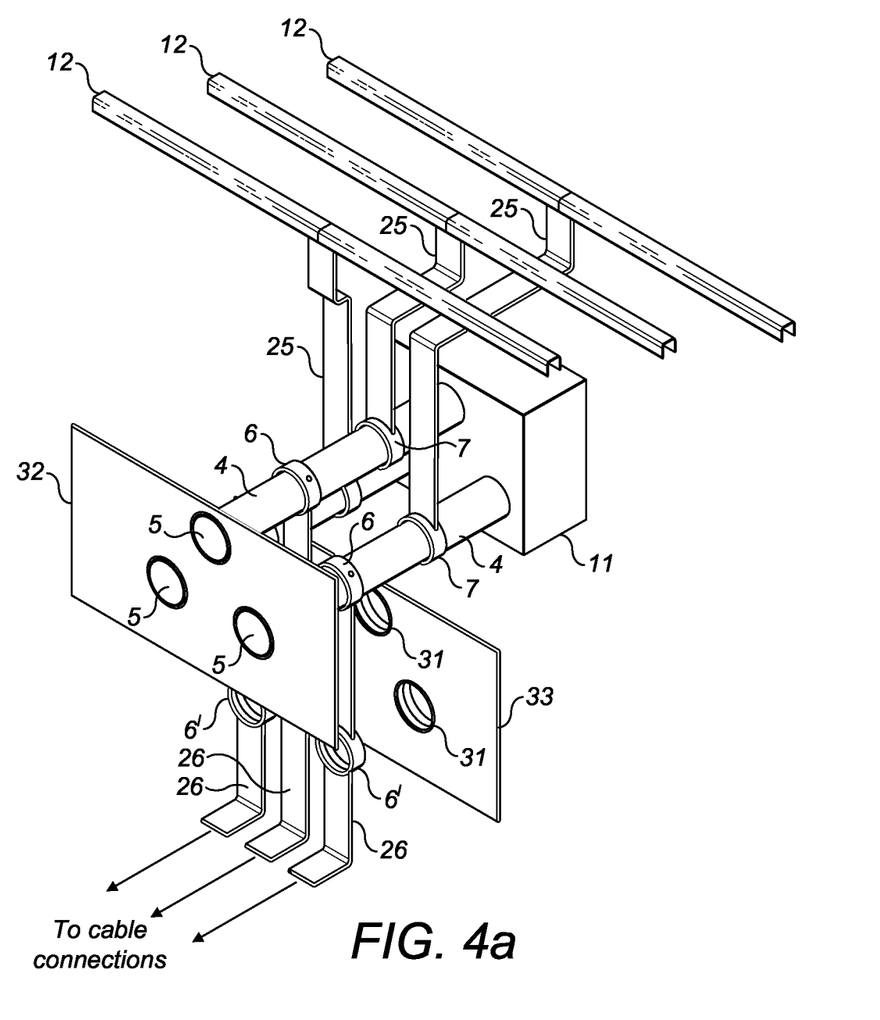
FIGS. 4a and 4b are schematic isometric views of the inside of electrical switch gear comprising the switch arrangement with the circuit breaker switching elements shown in the first position.
Figure 4B:
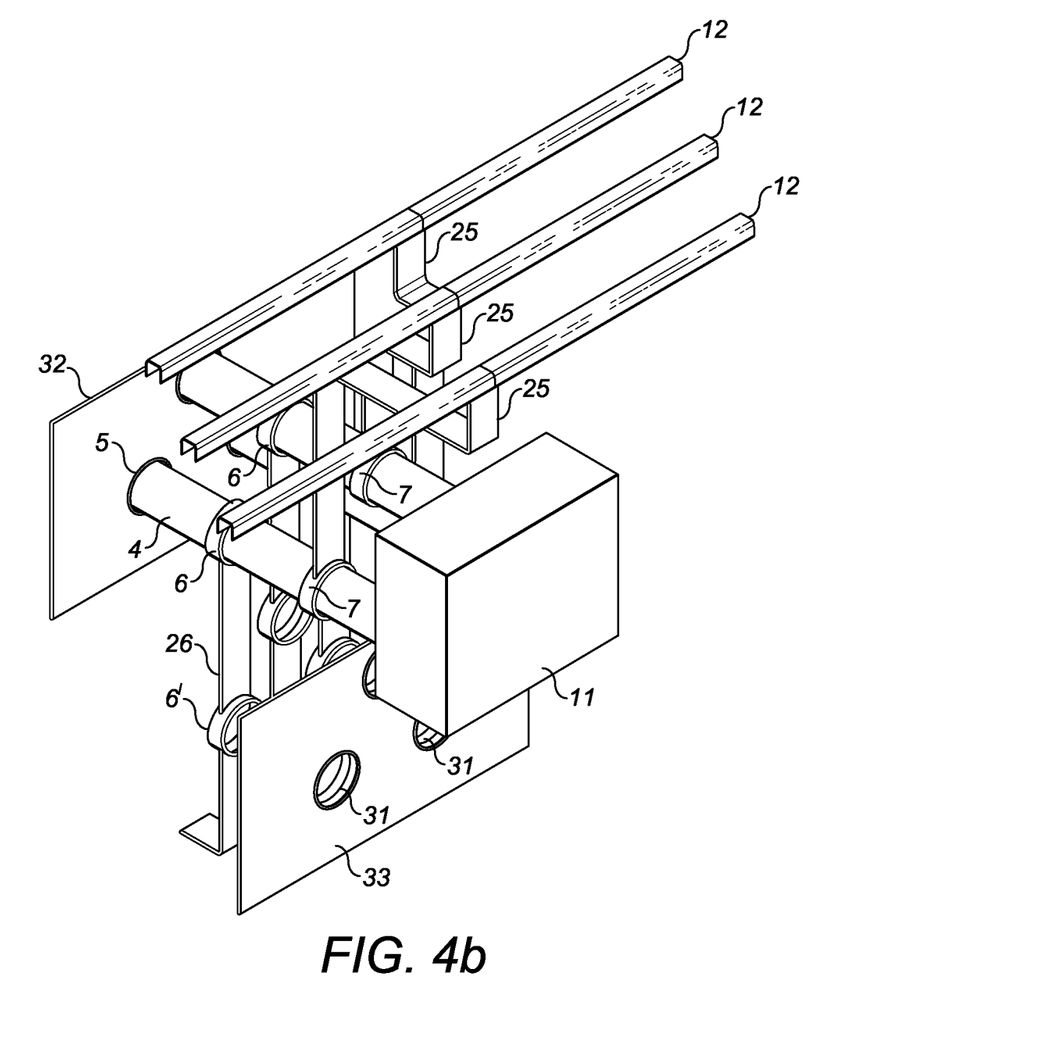

A drive mechanism 11 for driving the circuit breaker switching elements 4 between the first position illustrated in FIGS. 3, 4a and 4b (and FIG. 1a) and the second position illustrated in FIGS. 5a and 5b (and FIG. 2b) is contained in a middle forward compartment 21d. In this embodiment, the drive mechanism 11 comprises a power driven carrier unit mounted on a rail system (not shown) which supports the three pole breaker device, and is driven back and forth on the rail system to move the breaker switching elements 4, in unison, between the first and second positions. As explained above, the movement of the breaker switching elements 4 is substantially linear. The drive mechanism 11 and the breaker actuator assembly 8 share a common housing, but alternatively, the drive mechanism 11 may be housed within the switchgear separately from the breaker actuator assembly 8.

In the first position (see FIGS. 3, 4a and 4b), when the breaker switching elements 4 are closed, each group of three cable connections 27 is connected to earth via a conductor 26, a cable contact 6, a breaker switching element 4, an earth contact 5 and the ground plane sheet 32 which is earthed via a ground bar in the cabinet 20.

In the second position (See FIGS. 5a and 5b), when the breaker switching elements 4 are closed, each bus bar 12 is connected to a respective one of the three groups of cable termination 27 via a conductor 25, a bus bar contact 7, a breaker switching element 4, a cable contact 6 and a conductor 26. It will be appreciated that this arrangement, in which the bus electrical contacts 7 are located closer to the front of the switchgear than are the cable electrical contacts 6 or the earth electrical contacts 5, makes it easier to configure the layout of rear accessible switchgear. This is because, as illustrated in FIG. 3, with the contacts so positioned, it is straightforward to locate the busbar arrangement 22 in a compartment towards the front of the switchgear and the cable connections 27 in a different compartment towards the rear of the switchgear. In this way, access to the cable connections 27 may be gained from the rear of the switchgear without the busbar arrangement 22 causing any hindrance. Indeed, the cable connections 27 may be contained in a compartment that extends all of, or the majority of, the height of the cabinet, providing plenty of space for accessing the connections 27.

The switchgear 2 may further comprises a separate cable connection earthing arrangement 30 in a lower forward compartment 21e. The cable connection earthing arrangement 30 comprises three terminals each comprising a tubular insulating section 3b' that is substantially the same as the second section 3b of the terminals 3, containing a cable contact 6' that is substantially the same as the cable contacts 6. Each cable contact 6' is electrically connected by a respective one of the conductors 26 to a cable contact 6 above it and to a respective one of the three groups of cable termination 27. Each terminal of the earthing arrangement 30 further comprises a ring shaped earth contact 31 fitted through a respective one of three apertures formed in a conductive ground plane sheet 33. Each earth contact 31 is in circumferential contact with the ground plane 33. The breaker switching elements 4, the breaker actuator 8, and in this embodiment, the drive mechanism 11 form an integrated unit which can be easily removed from the middle forward compartment 21d by an operator and placed in a fourth position in the compartment 21e as illustrated in FIG. 6. In this fourth position, when the breaker switching elements 4 are closed, each group of three cable connections 27 is connected to earth via a conductor 26, a cable contact 6', a breaker switching element 4, an earth contact 31 and the ground plane sheet 33 which is earthed via the ground bar in cabinet 20. This provides an operator with the flexibility of grounding the cable terminations 27 by placing the three pole breaker device into the first position or the fourth position. The first position provides the convenience of grounding the cable terminations 27 without having to remove the three pole breaker from the compartment 21b if so desired. The fourth position enables the cable terminations 27 to be grounded by placing the three pole breaker in a compartment 21e where it is clear that the circuit cannot possibly be energised. When the three pole breaker occupies the fourth position the shutters 14 may be closed to isolate the voltage of the busbars 12.

Figure 7:
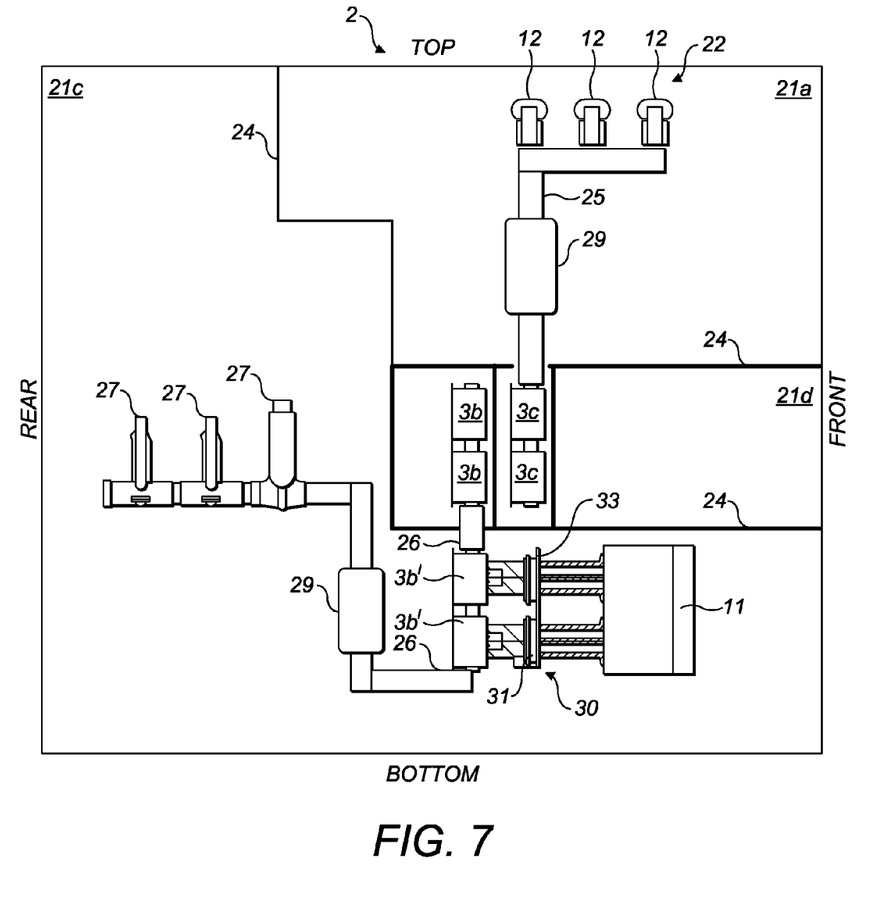
FIG. 7 is a schematic side view of the inside of an alternative example of an electrical switchgear comprising a switch arrangement comprising a three phase circuit breaker arrangement with circuit breaker switching elements.

As is best appreciated from FIGS. 5 to 7, the terminals 3 are arranged in parallel within the cabinet 20 in a triangular configuration, with the breaker switching elements 4 correspondingly arranged. In effect, the longitudinal axes of the terminals 3 (or the breaker switching elements 4) define the parallel edges of a notional triangular prism. This provides for a more compact arrangement than could be achieved by arranging the terminals 3 (and breaker switching elements 4) in parallel and horizontally, in parallel and vertically or in parallel and diagonally, although such arrangements may also be used in some embodiments.

Preferably, the triangular end faces of this notional prism are equilateral triangles (i.e. the three terminals 3 are equally spaced apart from each other) or isosceles triangles (i.e. the space between first and second of the terminals 3 and the space between first and third of the terminals are the same, but the space between the second and third of the terminals is different). As can seen from the FIGS. 4 and 5, a base of the notional prism is horizontal and faces the bottom of the cabinet 20. In an alternative embodiment, a base of the notional prism is horizontal and faces the top of the cabinet 20.

In an alternative embodiment illustrated in FIG. 6, each terminal 3 is the same as the terminals 3 illustrated in FIGS. 1 to 5, except it does not comprise a tubular section 3a and hence earth contact 5. In this embodiment, the breaker switching elements 4 are again placed into the second position, and are closed, in order for power to be supplied to the load. However, in order to earth the cable connections 27, the breaker switching elements 4 must be placed in the fourth position, as illustrated in FIG. 6. The first position illustrated in FIGS. 1 to 5 is not available in this embodiment because the terminals 3 do not comprise a tubular section 3a.

The embodiments of the disclosed concept described above provide for switchgear which is compact and has a switching arrangement which enables a particularly convenient spatial configuration of the components in a rear accessible switchgear. Many modifications or variations may be made to the described embodiments. For example, although the described terminal housing is in three distinct separate sections, it may instead be a single unitary housing with the contacts 5, 6, 7 being spaced apart along its length and electrically isolated from each other. Alternatively, the housing may comprise two distinct sections with one of the contacts, say the bus bar contact 7, in one section, and the other two contacts in the other section.

Although in the described embodiment, the switching device 4 is a circuit breaker, it will be appreciated that other devices that can make or break a circuit when in the first or second positions may be used, for example, a contactor, a load break switch or an isolation switch.

Although the drive mechanism is described as being powered it may be manually operated.

The general shape of the housing and of the switching device may of course vary from that described above.

It will be appreciated that the insulating tubular sections 3a housing the earth contacts 5 are not essential and so the earth contacts 5 need not be within a tubular housing.

The disclosed concept has been described in detail in the foregoing specification, and it is believed that various alterations and modifications of the disclosed concept will become apparent to those skilled in the art from a reading and understanding of the specification. It is intended that all such alterations and modifications are included in the disclosed concept, insofar as they come within the scope of the appended claims.

What is claimed is:

1. A rear accessible electrical switchgear comprising a front, a back, a switch arrangement, and a rear accessible switchgear cabinet having a rear accessible compartment containing a load connection, the switch arrangement comprising a terminal arrangement comprising an electrical contact for a bus and an electrical contact for said load connection which are spaced apart along an axial direction; and a switching device that is moveable linearly in said terminal arrangement along said axial direction to a service position where it can make an electrical connection between said electrical contact for said load connection and said electrical contact for said bus, wherein said electrical contact for said load connection is located closer to said back of said switchgear than is said electrical contact for said bus, wherein said terminal arrangement further comprises an electrical contact for earth, which is spaced apart from said electrical contact for said load connection along said axial direction and is located closer to said back of said rear accessible electrical switchgear than is said electrical contact for said load connection, wherein, said switching device is moveable linearly in said terminal arrangement along said axial direction to an earth position to make an electrical connection between said electrical contact for earth and said electrical contact for said load connection, and wherein said switching device can make and break a circuit when in the service or earth positions.

2. An electrical switchgear according to claim 1, wherein said switching device comprises one of a circuit breaker, a contactor, a load break switch or an isolation switch.

3. A rear accessible electrical switchgear according to claim 1 wherein, said terminal arrangement further comprises an insulating housing and said electrical contact for said bus and said electrical contact for said load connection comprise electrically conductive regions at an inner surface of said housing.

4. A rear accessible electrical switchgear according to claim 3, wherein, said housing is split into a plurality of separate sections along said axial direction, and wherein said electrical contact for said load connection is in one of said sections and said electrical contact for said bus is in another of said sections.

5. A rear accessible electrical switchgear according to claim 1, further comprising a drive mechanism for driving said switching device in said terminal arrangement.

6. A rear accessible electrical switchgear according to claim 1 wherein said switch arrangement comprises a plurality of said terminals and the switching device comprises a plurality of switching elements, one for each terminal.

7. A rear accessible electrical switchgear according to claim 6, wherein said plurality of terminals are arranged substantially in parallel and horizontally or vertically in said switchgear.

8. A rear accessible electrical switchgear according to claim 6 wherein said plurality of terminals are arranged in parallel and diagonally in said switchgear.

9. An electrical switchgear comprising a front, a back and a switch arrangement, the switch arrangement comprising a terminal arrangement comprising an electrical contact for a bus and an electrical contact for a load connection which are spaced apart along an axial direction; and a switching device that is moveable linearly in said terminal arrangement along said axial direction to a service position where it can make an electrical connection between said electrical contact for said load connection and said electrical contact for said bus, wherein said electrical contact for said load connection is located closer to said back of said switchgear than is said electrical contact for said bus, wherein said switching device comprises a first device electrical contact and a second device electrical contact, wherein, in said service position said first device electrical contact engages said electrical contact for said load connection and said second device electrical contact engages said electrical contact for said bus.

10. An electrical switchgear comprising a front, a back and a switch arrangement, the switch arrangement comprising a terminal arrangement comprising an electrical contact for a bus and an electrical contact for a load connection which are spaced apart along an axial direction; and a switching device that is moveable linearly in said terminal arrangement along said axial direction to a service position where it can make an electrical connection between said electrical contact for said load connection and said electrical contact for said bus, wherein said electrical contact for said load connection is located closer to said back of said switchgear than is said electrical contact for said bus, wherein said terminal arrangement further comprises an electrical contact for earth, which is spaced apart from said electrical contact for said load connection along said axial direction and is located closer to said back of said switchgear than is said electrical contact for said load connection, wherein, said device is moveable to an earth position where it can make an electrical connection between said electrical contact for earth and said electrical contact for said load connection, wherein said switching device comprises a first device electrical contact and a second device electrical contact, wherein, in said earth position said first device electrical contact engages said electrical contact for earth and said second device electrical contact engages said electrical contact for said load.

11. A switch arrangement for an electrical switchgear, said electrical switchgear comprising three phases, said switch arrangement comprising three terminals, one for each phase, wherein each of said three terminals comprises a longitudinal axis, which longitudinal axes are arranged in parallel and define three parallel edges of a notional triangular prism, wherein each terminal comprises a first electrical contact and a second electrical contact spaced apart along said longitudinal axis, wherein each terminal comprises an insulating housing and each terminal's first and second electrical contacts are within said housing, wherein said housing is split into a plurality of separate sections along said axial direction, wherein said first electrical contact is in one of said separate sections and said second electrical contact is in another of said separate sections, and wherein a shutter is structured to be drawn into a space between said one of said separate sections and said another of said separate sections, in order to act as a physical barrier to said first and second electrical contacts.

12. A switch arrangement according to claim 11 wherein said first electrical contact is for a bus and said second electrical contact is for a load connection.

13. A switch arrangement according to claim 11 wherein each terminal comprises an insulating housing and each terminal's first and second electrical contacts are within its insulating housing.

14. Electrical switch gear comprising said switch arrangement of claim 11.

\* \* \* \* \*